(12) United States Patent
Komatsu et al.

(10) Patent No.: US 7,886,170 B2
(45) Date of Patent: Feb. 8, 2011

(54) POWER MANAGEMENT OF IMAGE FORMING APPARATUS AND CONTROL METHOD THEREFOR

(75) Inventors: Shunichi Komatsu, Abiko (JP); Tomohiro Tamaoki, Moriya (JP); Takahiro Ushiro, Toride (JP); Kenji Hiromatsu, Abiko (JP); Izuru Horiuchi, Toride (JP); Keizo Isemura, Koganei (JP)

(73) Assignee: Canon Kabushiki Kaisha (JP)

( * ) Notice: Subject to any disclaimer, the term of this patent is extended or adjusted under 35 U.S.C. 154(b) by 889 days.

(21) Appl. No.: 11/739,682

(22) Filed: Apr. 24, 2007

(65) Prior Publication Data

US 2007/0260753 A1  Nov. 8, 2007

(30) Foreign Application Priority Data

Apr. 25, 2006 (JP) .............................. 2006-121272

(51) Int. Cl.
*G06F 1/26* (2006.01)
(52) U.S. Cl. ...................... 713/323; 713/310; 713/322; 713/324
(58) Field of Classification Search .................. 713/310, 713/322–324
See application file for complete search history.

(56) References Cited

U.S. PATENT DOCUMENTS

| | | | | |
|---|---|---|---|---|
| 5,471,621 | A | * | 11/1995 | Ohtsuki ........................ 713/323 |
| 5,517,552 | A | * | 5/1996 | Yamashita ................ 455/556.1 |
| 6,762,595 | B2 | * | 7/2004 | Tamai et al. ................. 323/266 |
| 2004/0004732 | A1 | * | 1/2004 | Takeda et al. .............. 358/1.13 |

FOREIGN PATENT DOCUMENTS

| | | |
|---|---|---|
| JP | 10-031531 A | 2/1998 |
| JP | 2002-086844 A | 3/2002 |

* cited by examiner

*Primary Examiner*—Thuan N Du
(74) *Attorney, Agent, or Firm*—Rossi, Kimms & McDowell LLP

(57) ABSTRACT

The conventional techniques cannot set optimal energy saving modes separately for a plurality of loads and can hardly attain further suppression of power consumption. To accomplish this, in an image forming apparatus including a main circuit board which has a master CPU and controls the operation of the entire image forming apparatus, and a plurality of sub circuit boards each have a slave CPU and control each corresponding control target, the operating condition of each slave CPU is stored in correspondence with the operation mode of the image forming apparatus, and, upon being notified of the operation modes of the image forming apparatus, the slave CPU of each of the plurality of sub circuit boards sets the operation status of the slave CPU by referring to the table of the operation modes.

16 Claims, 7 Drawing Sheets

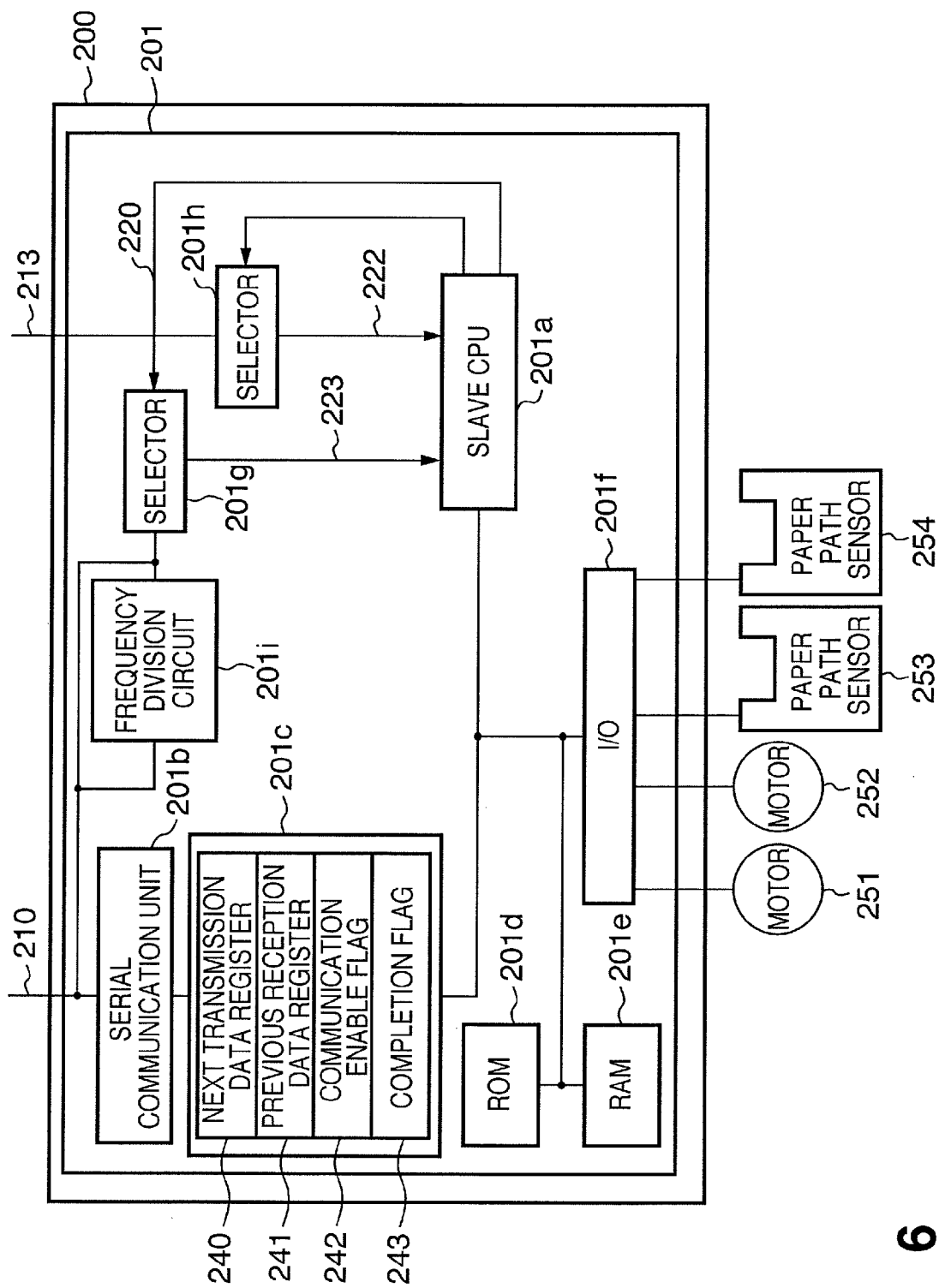
F I G. 6

POWER MANAGEMENT OF IMAGE FORMING APPARATUS AND CONTROL METHOD THEREFOR

BACKGROUND OF THE INVENTION

1. Field of the Invention

The present invention relates to an image forming apparatus and control method therefore which has a master CPU and a slave CPU to control an image forming operation by communication between these CPUs.

2. Description of the Related Art

In conventional printer apparatuses, a master CPU and ASIC (dedicated customer LSI) are arranged on a main circuit hoard to cause the ASIC to control all loads such as a pulse motor driving module and high-voltage module. In an energy saving mode for saving power consumption while the printer apparatus is left unused for a predetermined period of time, the ASIC also controls to, for example, decrease the clock frequency and driving supply voltage to the master CPU or set them to zero.

Japanese Patent Laid-Open No. 10-031531 is available as a reference which discloses the above technique. This reference describes a technique for reducing power consumption by decreasing the clock frequency and supply voltage to the (master) CPU under a predetermined condition such as standby. Japanese Patent Laid-Open No. 2002-086844 describes a printer apparatus which prints while a clock signal and driving current are reduced, in non-urgent time designation printing (timer printing) in the time zone during which the frequency of usage of the printer apparatus is low.

The above-described prior arts decrease the clock frequency and supply voltage to the master CPU or set them to zero to do control while suppressing power consumption. This equally sets all the loads in the printer apparatus to an energy saving mode. In this manner, the conventional techniques cannot set optimal energy saving modes separately for a plurality of loads and can hardly attain further suppression of power consumption.

SUMMARY OF THE INVENTION

The present invention enables realization of solution of the above conventional problems. According to the present invention, it is also possible to set the operating condition for each sub circuit board corresponding to the control target. This makes it possible to, for example, execute power saving control for each sub circuit board corresponding to the control target.

One aspect of the present invention provides an image forming apparatus comprising: a master CPU adapted to control an operation of the image forming apparatus; a slave CPU adapted to control a control target; a communication unit adapted to execute communication between the master CPU and the slave CPU; and a storage unit adapted to store an operating condition corresponding to a power consumption amount of the slave CPU in accordance with an operation mode of the image forming apparatus, wherein the slave CPU changes an operation of the slave CPU on the basis of the operation mode sent from the master CPU via the communication unit and the operating condition in the storage unit.

Another aspect of the present invention provides a method of controlling an image forming apparatus which comprises a master CPU adapted to control an operation of the image forming apparatus, a slave CPU adapted to control a control target, a communication unit adapted to execute communication between the master CPU and the slave CPU, and a storage unit adapted to store an operating condition corresponding to a power consumption amount of the slave CPU in accordance with an operation mode of the image forming apparatus, comprising the steps of: notifying, from the master CPU, the slave CPU of an operation mode of the image forming apparatus; and causing the slave CPU to set an operation of the slave CPU by referring to the storage unit, in accordance with a notification in the notifying step.

Further features of the present invention will become apparent from the following description of exemplary embodiments with reference to the attached drawings.

BRIEF DESCRIPTION OF THE DRAWINGS

FIG. 6 is a block diagram for explaining the arrangement of a one-chip microcomputer according to the second embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
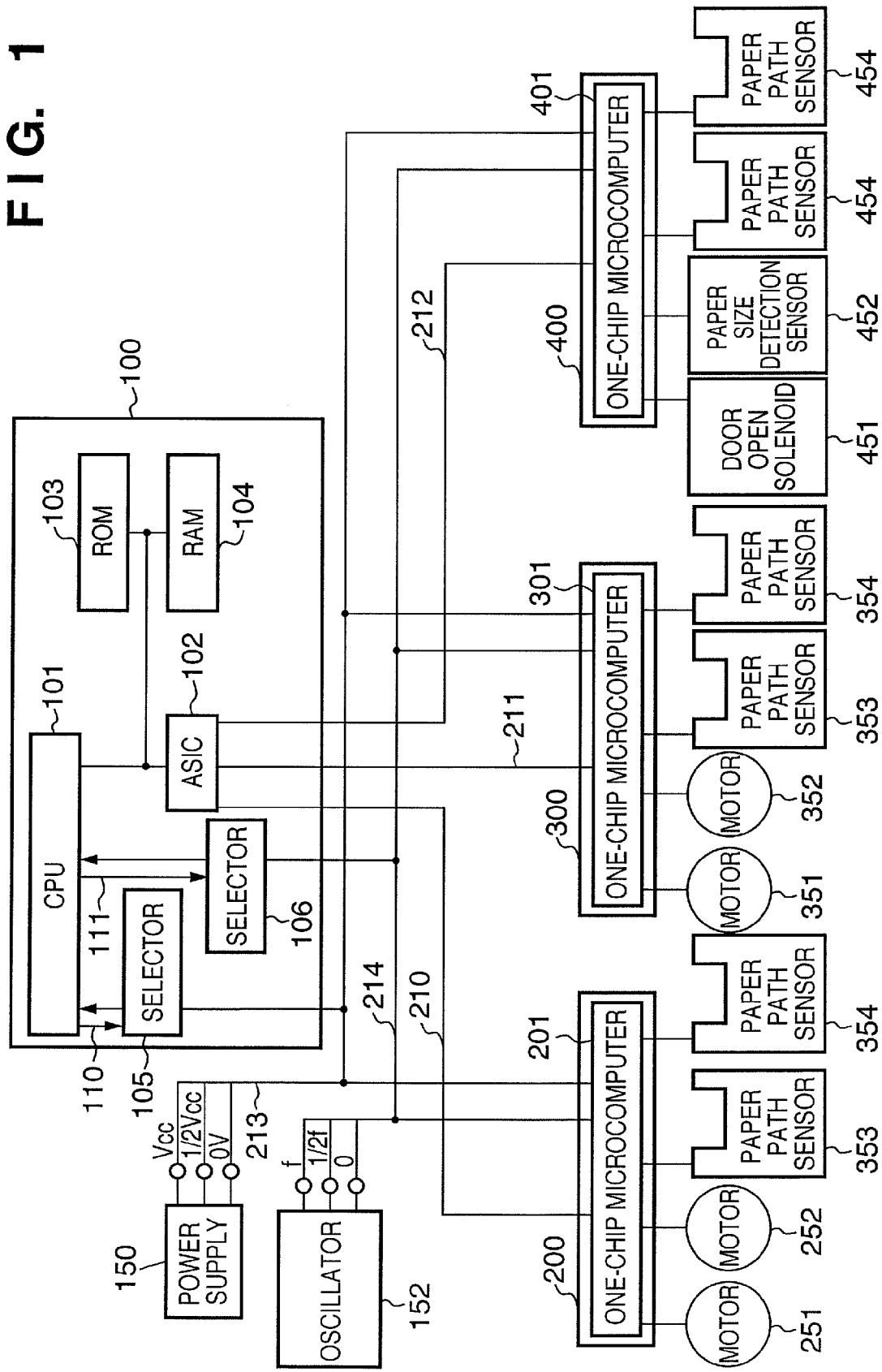
FIG. 1 is a block diagram for explaining the arrangement of a laser printer apparatus (image forming apparatus) according to the first embodiment of the present invention.

FIG. 1 is a block diagram for explaining the arrangement of a laser printer apparatus (image forming apparatus) according to the first embodiment of the present invention.

Referring to FIG. 1, reference numeral 100 denotes a main circuit board in which a control unit which controls the laser printer apparatus is mounted. A master CPU 101 controls various operations of the printer apparatus in accordance with programs and data stored in a ROM 103. A RAM 104 provides a memory area to serve as a work area in the process by the master CPU 101. An ASIC 102 is a dedicated customer LSI designed to execute a specific process, and comprises a logic circuit including a register which allows read/write from/in the master CPU 101. A selector 105 or 106 selects a voltage or clock to be input in accordance with a select signal 110 or 111 from the master CPU 101, and outputs it to the master CPU 101. The selector 105 receives power supply voltages at a plurality of voltage levels (to be described later) from a power supply line 213, selects the voltage selected in accordance with the select signal 110, and supplies it to the master CPU 101. The selector 106 receives clocks at a plurality of frequencies (to be described later) from a clock signal line 214, selects a clock at the frequency selected in accordance with the select signal 111, and supplies it to the master CPU 101.

Reference numeral 200 denotes a first sub circuit board in which a one-chip microcomputer 201 is mounted. The one-chip microcomputer 201 serially communicates with the master CPU 101 of the main circuit board 100 via a signal line 210. The one-chip microcomputer 201 connects to motors 251 and 252 and paper path sensors 253 and 254. Although the first sub circuit board 200 connects to the motors 251 and 252 and sensors 253 and 254 via an interface circuit, this interface circuit is not illustrated in FIG. 1. The same applies to other sub circuit boards 300 and 400 to be described later. The first sub circuit board 200 executes image formation control such as scan control of laser light emitted by a semiconductor laser and rotation control of a photosensitive drum. The first sub circuit board 200 is always required to control the connected load at a high response speed. From the viewpoint of the image formation speed, it is difficult to decrease or stop the clock frequency of the one-chip microcomputer 201 of the first sub circuit board 200. A one-chip microcomputer mounted in each sub circuit board is a one-chip microprocessor in which a microcomputer incorporates a program ROM and RAM.

Reference numeral 300 denotes the second sub circuit board in which a one-chip microcomputer 301 is mounted. The one-chip microcomputer 301 serially communicates with the ASIC 102 of the main circuit board 100 via a signal line 211. The one-chip microcomputer 301 connects to motors 351 and 352 and paper path sensors 353 and 354. Assume, for example, that the second sub circuit board 300 executes a relatively low-speed process such as control to merely excite the connected motors 351 and 352. In the second sub circuit board 300, it is possible in an energy saving mode to stop a clock supplied to the one-chip microcomputer 301. The energy saving mode indicates a mode in which lower power is consumed than in a normal operation or standby state.

Reference numeral 400 denotes the third sub circuit board in which a one-chip microcomputer 401 is mounted. The one-chip microcomputer 401 serially communicates with the ASIC 102 of the main circuit board 100 via a signal line 212. The one-chip microcomputer 401 connects to a door open solenoid 451, paper size detection sensor 452, and paper path sensors 453 and 454. Assume, for example, that the third sub circuit board 400 executes, for example, detection of a recording sheet from a paper feed cassette and conveyance control for feeding a recording sheet. The third sub circuit board 400 executes control of the connected load, which attaches relatively little importance to the response speed, such as door open/close control and a process for detecting the paper size until a paper feed operation starts. In the third sub circuit board 400, it is possible to decrease the clock frequency of the one-chip microcomputer 401 in an energy saving mode.

Although the three sub circuit boards are exemplified here, the present invention is not limited to three. For example, the sum total (N) of these circuit boards may also be about 50.

A power supply 150 supplies three types of power supply voltages, that is, power supply voltages Vcc, Vcc/2, 0V (zero voltage). These three types of power supply voltages are collected in the power supply line 213. The voltage Vcc/2 implies a voltage lower than the voltage Vcc, and its coefficient is not limited to ½. Also for convenience, the voltage 0V (zero voltage) implies that no power supply voltage is supplied, and even implies a scheme which shuts off supply of the voltage Vcc or Vcc/2 in an actual circuit. Not the main circuit board 100 but the slave CPU of each sub circuit board controls to switch a power supply voltage supplied to the CPU of each sub circuit board. An oscillator 152 supplies three types of frequencies, that is, frequencies f, f/2, and 0 Hz (zero hertz). Clock signals at these three types of frequencies are collectively indicated by the clock signal line 214. The frequency f/2 implies that a clock at a frequency lower than the frequency f is supplied to each CPU, and its coefficient is not limited to ½. Also for convenience, the clock frequency 0 Hz (zero hertz) implies that no clock is supplied, and even implies a scheme which shuts off supply of a clock at the frequency f or f/2 in an actual circuit. Not the main circuit board 100 but each corresponding sub circuit board controls to switch a clock frequency supplied to the CPU of each sub circuit board, like power supply voltage switching.

Each of the signal lines 210 to 212 is a signal line for communication between the ASIC 102 and the one-chip microcomputer of each sub circuit board.

Figure 2:
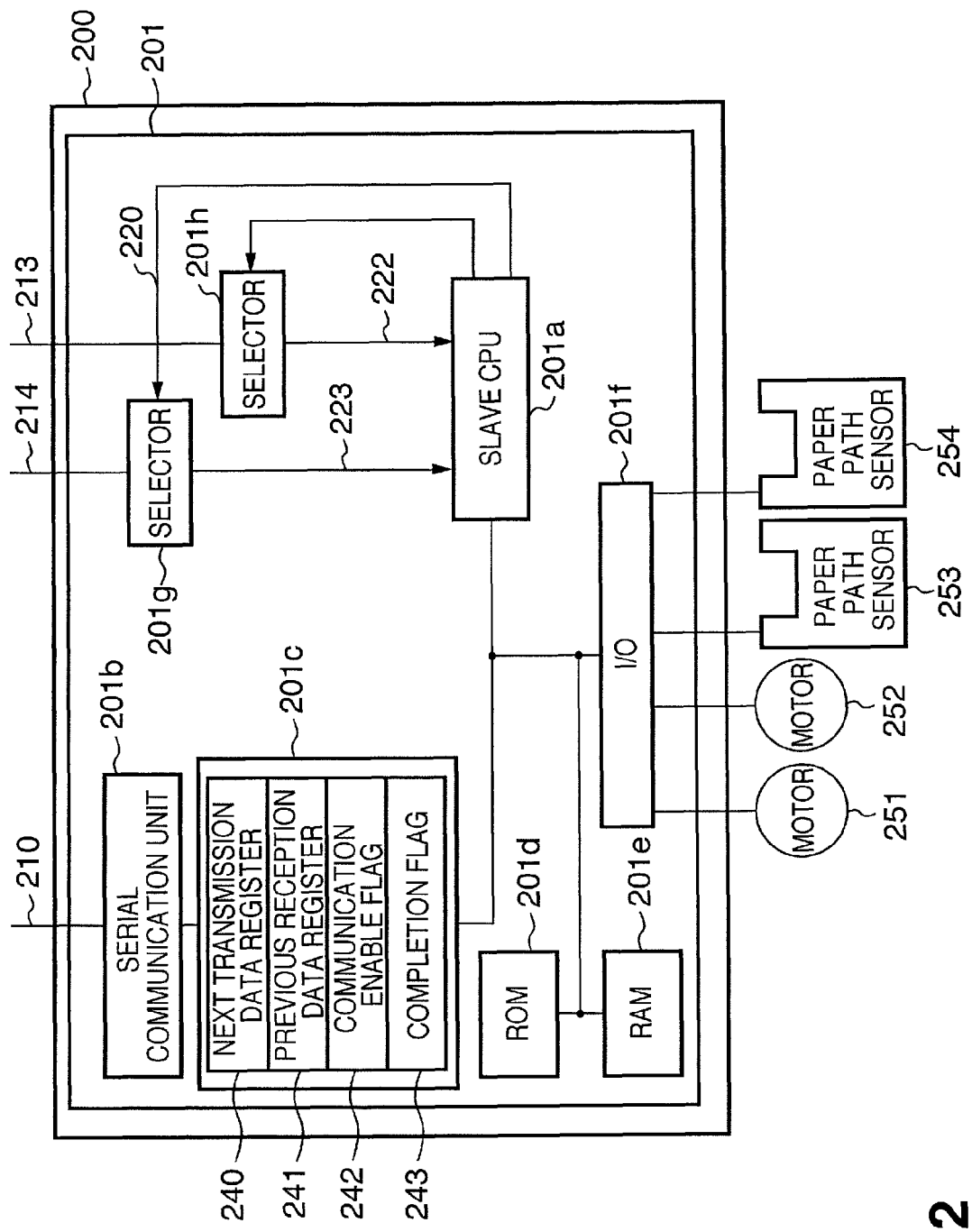
FIG. 2 is a block diagram for explaining the detailed arrangement of a one-chip microcomputer of a sub circuit board according to the first embodiment.

FIG. 2 is a block diagram for explaining the detailed arrangement of the one-chip microcomputer 201 of the sub circuit board 200 according to the first embodiment. The arrangements of the other sub circuit boards are basically the same, and a description thereof will be omitted.

The one-chip microcomputer 201 has a slave CPU 201a, a ROM 201d which stores a processing program of the slave CPU 201a, and a RAM 201e which allows read/write by the slave CPU 201a. An input/output (I/O) interface 201f controls the interface between the slave CPU 201a, and the motors 251, 252 and sensors 253, 254. A serial communication unit 201b is a communication unit for serial communication with the main circuit board 100 via the signal line 210. A group of registers 201c connects to the serial communication unit 201b and can do read/write from/in the slave CPU 201a.

A selector 201g receives a collection of the three types of frequencies, that is, frequencies f, f/2, and 0 Hz (zero hertz) via the clock signal line 214. The selector 201g selects a clock 223 to be supplied to the slave CPU 201a, in accordance with a select signal 220 from the slave CPU 201a. A selector 201h receives a collection of the three types of power supply voltages, that is, power supply voltages Vcc, Vcc/2, and 0V (zero voltage) via the power supply line 213. The selector 201h selects a power supply voltage to be supplied to the slave CPU 201a, in accordance with a select signal 221 from the slave CPU 201a, and outputs it as a power supply voltage 222. In this manner, each corresponding sub circuit board controls to switch the clock frequency and power supply voltage supplied to the CPU of each sub circuit board.

The group of registers 201c has a 16-bit next transmission data register 240, 16-bit previous reception data register 241, 1-bit communication enable flag 242, and 1-bit completion flag 243. Serial communication is done for every 16 bits both in transmission and reception. A transmission signal (not shown) and reception signal (not shown) operate in synchronism with a synchronization communication clock. Since this operation is general synchronization serial communication, only a brief description thereof will be given below.

The slave CPU 201a writes data for transmission at the next transmission timing in the next transmission data register 240. The serial communication unit 201b transmits 16-bit data stored in the next transmission data register 240 to the ASIC 102 (or master CPU 101) via the signal line 210. The previous reception data register 241 stores the latest data received by the serial communication unit 201b from the ASIC 102 (or master CPU 101) via the signal line 210. The slave CPU 201a can read the latest received data. The communication enable flag 242 is a flag representing whether communication via the serial communication unit 201b is possible. When the next data for transmission is written in the next transmission data register 240 while the communication enable flag 242 is ON, it can be transmitted to the ASIC 102 (or master CPU 101) via the signal line 210. Every time the serial communication unit 201b completes one-time transmission/reception, "1" is written in the completion flag 243. If the completion flag 243 is "1", the slave CPU 201a recognizes that transmission/reception is complete and writes "0" in the completion flag 243 upon every recognition. The slave CPU 201a recognizes the completion flag 243 by interruption. Upon accepting interruption, the slave CPU 201a automatically writes "0" in the completion flag 243. Therefore, it is not necessary to describe a program for writing "0" in the completion flag 243. The RAM 201e stores data previously input via the input/output (I/O) interface 201f, chattering removal data, and a chattering removal flag. A detailed description of them will be omitted.

Although the explanation with reference to FIG. 2 relates to the first sub circuit board 200, the same applies to the second sub circuit board 300 or third sub circuit board 400, and a description thereof will be omitted. The difference in meaning among the sub circuit boards 200, 300, and 400 is as above.

Figure 3:
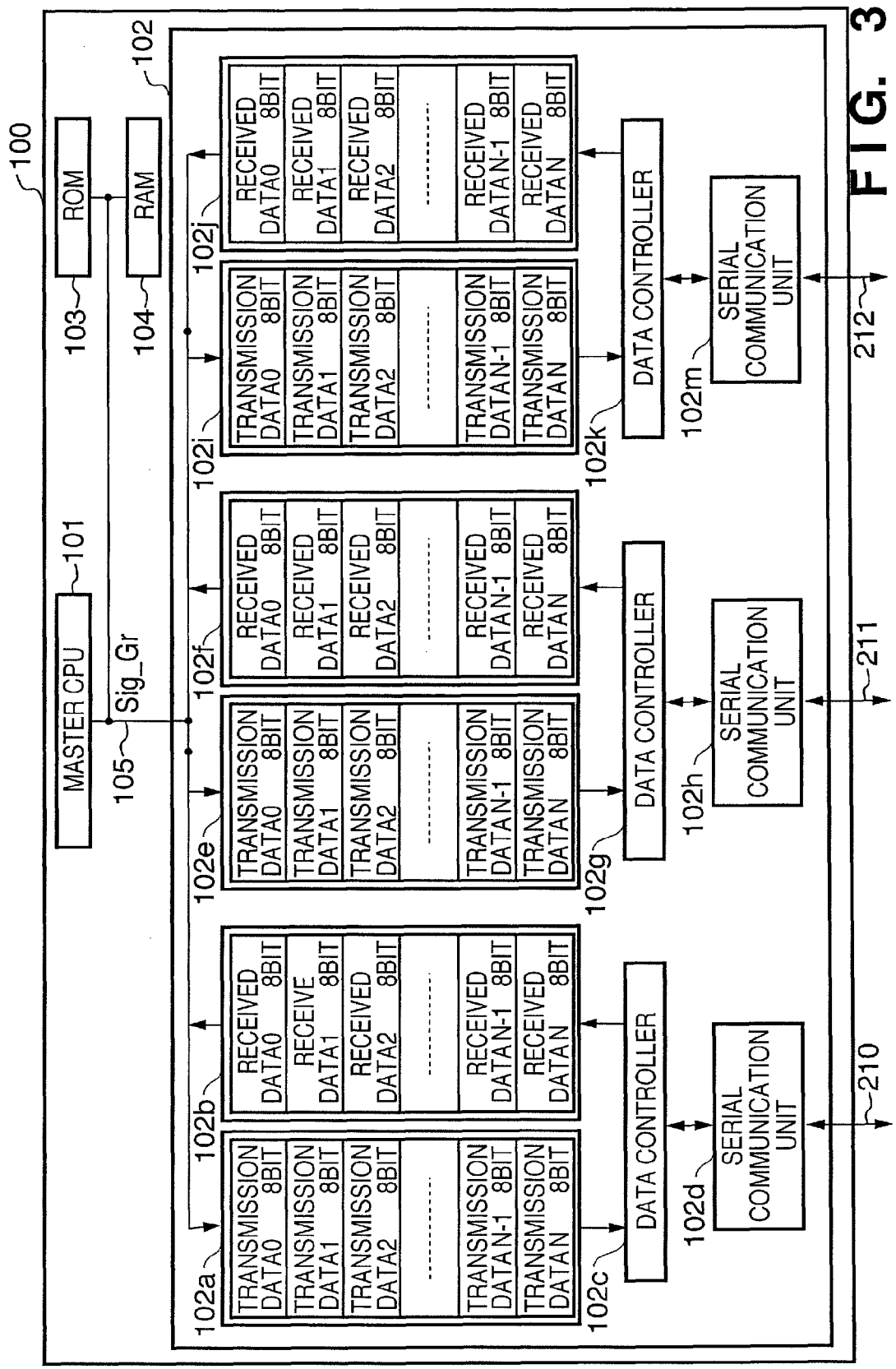
FIG. 3 is a block diagram for explaining an ASIC of a main circuit board according to the first embodiment.

FIG. 3 is a block diagram for explaining the ASIC 102 of the main circuit board 100 according to the first embodiment. The same reference numerals as in FIGS. 1 and 2 denote common parts in FIG. 3, and a repetitive description thereof will be omitted.

A serial communication unit 102d serially communicates with the first sub circuit board 200 via the signal line 210. A register 102a is a register which stores transmission data in data numerical order. When the master CPU 101 writes 8-bit transmission data in the register 102a, a data controller 102c assigns data numbers to the higher 8-bits in accordance with the numerical order of stored data, and transmits data of a total of 16 bits to the serial communication unit 102d. In this manner, transmitted/received data of the 16-bit, the higher 8 bits represent the data numbers and the lower 8 bits represent significant data.

A register 102b is a register which stores 16-bit received data in data numerical order represented by its higher 8 bits. That is, the data controller 102c interprets, as the data numbers, the higher 8 bits of the 16-bit data received by the serial communication unit 102d, while it stores the lower 8 bits at the address of the received data storage register 102b corresponding to their data numbers.

The master CPU 101 can detect the states of the paper path sensors 253 and 254 sent from the first sub circuit board 200 by reading the received data stored in the received data storage register 102b.

Since registers 102e, 102f, 102i, 102j, data controllers 102g, 102k, and serial communication units 102h, 102m corresponding to the second sub circuit board 300 and third sub circuit board 400 operate in the same manner as described above, a description thereof will be omitted.

Figure 4:
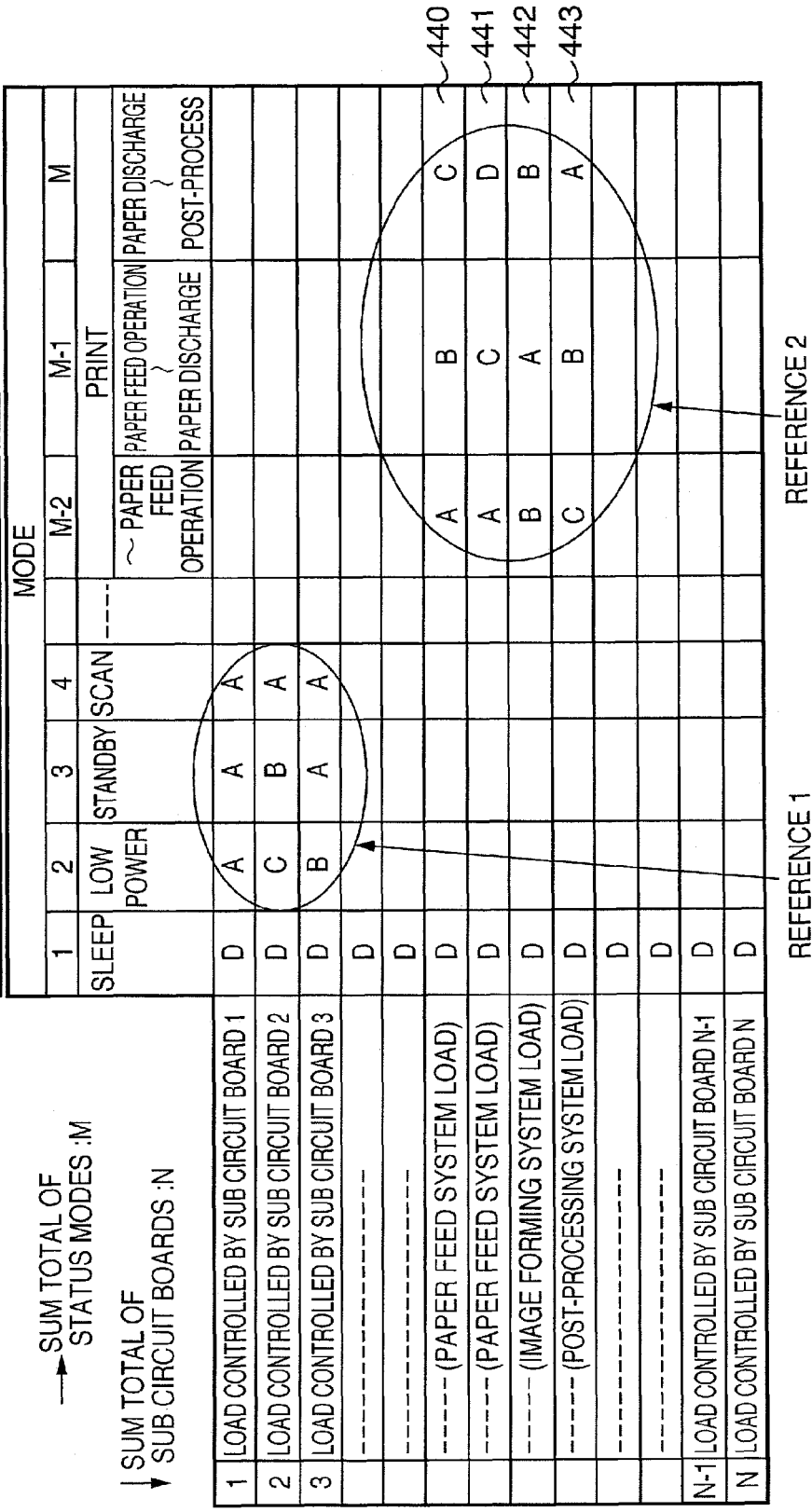
FIG. 4 is a table for explaining the relationship between the clock and supply voltage to the CPU of each sub circuit board corresponding to various statuses and energy saving modes in the printer apparatus according to the first embodiment.

FIG. 4 is a table for explaining the operation mode of the printer apparatus and the relationship between the clock and the supply voltage to the CPU of each sub circuit board. The operation modes of the printer apparatus include a plurality of energy saving modes and statuses of progress of a print operation. These sub circuit boards are indicated by 1 to N, and each include the first to third sub circuit boards 200, 300, and 400.

Referring to FIG. 4, the vertical direction represents the types of sub circuit boards, and their sum total is N. The horizontal direction represents the operation modes of the printer apparatus, and their sum total is M. These operation modes indicate modes such as sleep, low power, standby, scan, and print (until a paper feed operation, from the paper feed operation until paper discharge, and from paper discharge until a post-process). The following statuses A to D exist for each operation mode. In the sleep state, power supply to each slave CPU is stopped in either sub circuit board for energy saving control (status D).

The status A represents a state in which the slave CPU executes a normal operation. The status B represents a state in which a clock frequency supplied to the slave CPU decreases. The status C represents a state in which supply of a clock to the slave CPU is stopped. The status D represents a state in which power supply to the slave CPU is stopped. References 1 and 2 will be explained here. Although one of the statuses A to D is determined in correspondence with all the operation modes in addition to references 1 and 2 in actual control, a description thereof will be omitted.

Reference 1 indicates that sub circuit board 1 200, sub circuit board 2 300, and sub circuit board 3 400 each set one of the above-described statues A to D in correspondence with the operation modes of low-power, standby, and scan.

First sub circuit board 1 200 is always required to control the connected load at a high response speed. The slave CPU 201a must be normally operated in all the operation modes of an operation in a low-power mode in progress, standby in progress, and scan in progress. Therefore, the "status A" is set in all these operation modes.

The connected load is a motor in second sub circuit board 2 300. It suffices that sub circuit board 2 300 holds the contents of the RAM and register of the one-chip microcomputer 301 to maintain excitation of the motor. The slave CPU is normally operated (status A) during scanning, while a clock frequency to the slave CPU can decrease (status B) during standby. During an operation in a low-power mode, supply of a clock to the slave CPU is stopped (status C). The above control allows better energy saving control than with the conventional control.

Third sub circuit board 3 400 executes control of the connected load, which attaches relatively little importance to the response speed. For example, sub circuit board 3 400 executes door open/close control or paper size detection which does not require a high response speed. It suffices that the paper size is detected until the paper feed operation starts. The slave CPU is normally operated (status A) during scanning and standby, while a clock frequency to the slave CPU decreases (status B) during an operation in a low-power mode. The above control allows better energy saving control than with the conventional control.

In the first embodiment, the first to third sub circuit boards 200, 300, and 400 can practice optimal energy saving in accordance with the operation mode of the printer apparatus without depending on the master CPU 101 (main circuit board 100). However, the load on the master CPU 101 does not completely become zero. The master CPU 101 and each slave CPU must exchange a message indicating that "the current operation mode of the printer apparatus is a low-power mode".

However, once the master CPU 101 and each slave CPU make the communication, each sub circuit board executes optimal energy saving control independently of the master CPU 101 thereafter. In an actual printer apparatus, for example, the number of loads to be controlled (=N) is about 50, and the number of operation modes (=M) is about 20. In view of this, the present invention produces a large effect of reducing the load on the master CPU 101.

Conventionally, an energy saving mode is fixed during, for example, a print operation period to classify the operation modes, and the print operation period is never divided into a plurality of periods to change the energy saving mode for each period.

In the first embodiment, however, the print operation period is divided into a plurality of periods to set optimal energy saving control for each period as indicated by reference 2 shown in FIG. 4. This allows better energy saving control than with the conventional control. For example, when the paper feed operation is complete, a paper feed system load denoted by reference numeral 440 allows a shift to an energy saving mode that is possible at that time. Therefore, in the paper feed system load, the slave CPU of the corresponding sub circuit board executes a normal operation (status A) until (before starting) the paper feed operation. From (after starting) the paper feed operation until paper discharge (paper discharge from the main body of the image forming apparatus), a clock frequency to the slave CPU of the corresponding sub circuit board decreases (status B). From paper discharge until the post-process, supply of a clock to the slave CPU of the corresponding sub circuit board is stopped (status C).

Similarly, in a paper feed system load denoted by reference numeral 441, the slave CPU of the corresponding sub circuit board executes a normal operation (status A) until the paper feed operation. From the paper feed operation until paper discharge, supply of a clock to the slave CPU of the corresponding sub circuit board is stopped (status C). From paper discharge until the post-process, power supply to the slave CPU of the corresponding sub circuit board is stopped (status D).

In an image forming system load denoted by reference numeral 442, a clock frequency to the slave CPU of the corresponding sub circuit board decreases (status B) until the paper feed operation. From the paper feed operation until paper discharge, the slave CPU of the corresponding sub circuit board executes a normal operation (status A). From paper discharge until the post-process, a clock frequency to the slave CPU of the corresponding sub circuit board decreases (status B).

Also in a post-processing system load denoted by reference numeral 443, supply of a clock to the slave CPU of the corresponding sub circuit board is stopped (status C) until the paper feed operation. From the paper feed operation until paper discharge, a clock frequency to the slave CPU of the corresponding sub circuit board decreases (status B). From paper discharge until the post-process, the slave CPU of the corresponding sub circuit board executes a normal operation (status A).

More specifically, an optimal one of the energy saving states A, B, C, and D in a given sub circuit board is determined from two factors, that is, a response speed required for a load to be controlled by the sub circuit board and the state of the printer apparatus. Although the first embodiment has been explained with reference to the case in which the four, A, B, C, and D statuses are available for control in the energy saving mode, the present invention is not limited to these. The types and number of statuses are not limited to the explained example.

A ROM such as the ROM 201d in case of the first sub circuit board 200 stores data representing the statuses A to D, as shown in FIG. 4 in, for example, a table format for each sub circuit board and each operation mode. The slave CPU of each sub circuit board can execute optimal energy control for each sub circuit board in accordance with the operation mode of the printer.

As described above, a means for operating the CPU in each of the statuses A, B, C, and D receives the three types of frequencies, that is, frequencies f, f/2, and 0 Hz (zero hertz) via the clock signal line 214. For example, in the first sub circuit board 200, the slave CPU switches the selector 201g via the select signal 220 to send the clock 223 at the designated frequency to the slave CPU 201a. The selector 201h receives the three types of power supply voltages, that is, power supply voltages Vcc, Vcc/2, and 0V (zero voltage), and supplies, to the slave CPU 201a, the power supply voltage 222 designated from the slave CPU 201a via the select signal 221.

As has been described above, according to the first embodiment, it is possible to execute energy saving control for each sub circuit board in accordance with the operation mode of the printer. This allows finer energy saving control.

Second Embodiment

Figure 5:
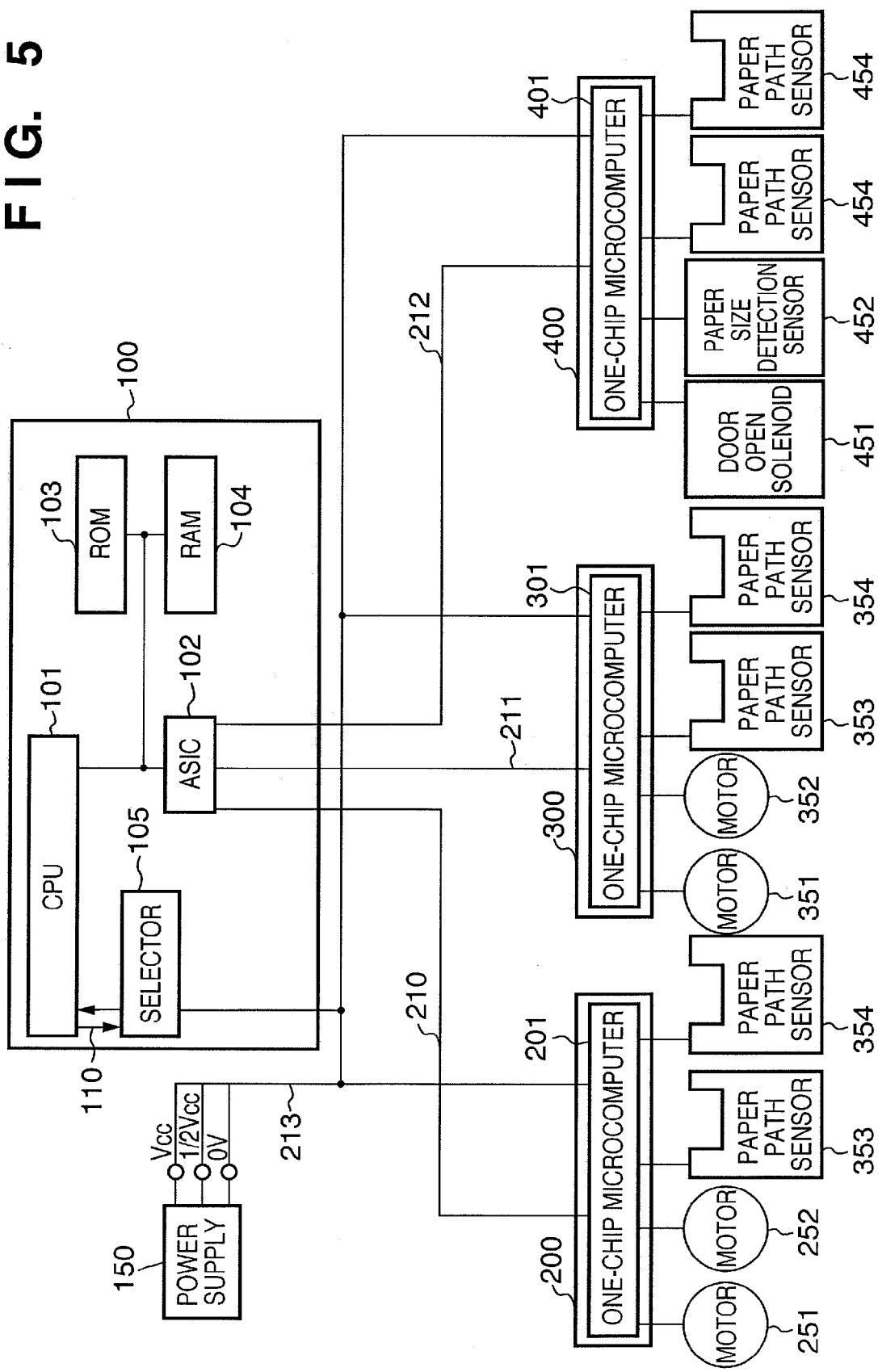
FIG. 5 is a block diagram for explaining the arrangement of a laser printer apparatus (image forming apparatus) according to the second embodiment of the present invention.

FIG. 5 is a block diagram for explaining the arrangement of a laser printer apparatus (image forming apparatus) according to the second embodiment of the present invention. The same reference numerals as in FIG. 1 described above denote common parts in FIG. 5, and a repetitive description thereof will be omitted.

In the above-described first embodiment, each slave CPU such as the slave CPU 201a receives a collection of clocks at respective frequencies from the oscillator 152. In the second embodiment, however, a synchronization communication clock to be input to a serial communication unit such as a serial communication unit 201b, and a clock signal formed by the corresponding frequency division circuit are used.

FIG. 6 is a block diagram for explaining the arrangement of a one-chip microcomputer 201 according to the second embodiment of the present invention. The same reference numerals as in FIG. 2 described above denote common parts in FIG. 6, and a repetitive description thereof will be omitted.

A frequency division circuit 201i receives a synchronization communication clock to be input to the serial communication unit 201b. There are available two types of clocks 230 which include the input synchronization communication clock and the clock signal frequency-divided by the frequency division circuit 201i. A selector 201g selects these clock signals in accordance with a select signal 220. A slave CPU 201a receives a clock signal at the selected frequency. The oscillator 152 is unnecessary in the second embodiment.

When the selector 201g sets to select none of these clock signals in accordance with the select signal 220, it is also possible to stop supply of a clock to the CPU as in the above-described first embodiment.

As described above, according to the second embodiment, it is possible to execute energy saving control for each sub circuit board in accordance with each status in the operation mode of the printer. This allows finer energy saving control. It is also possible to reduce the costs of the apparatus because the oscillator 152 can be omitted, unlike the first embodiment.

Figure 7:
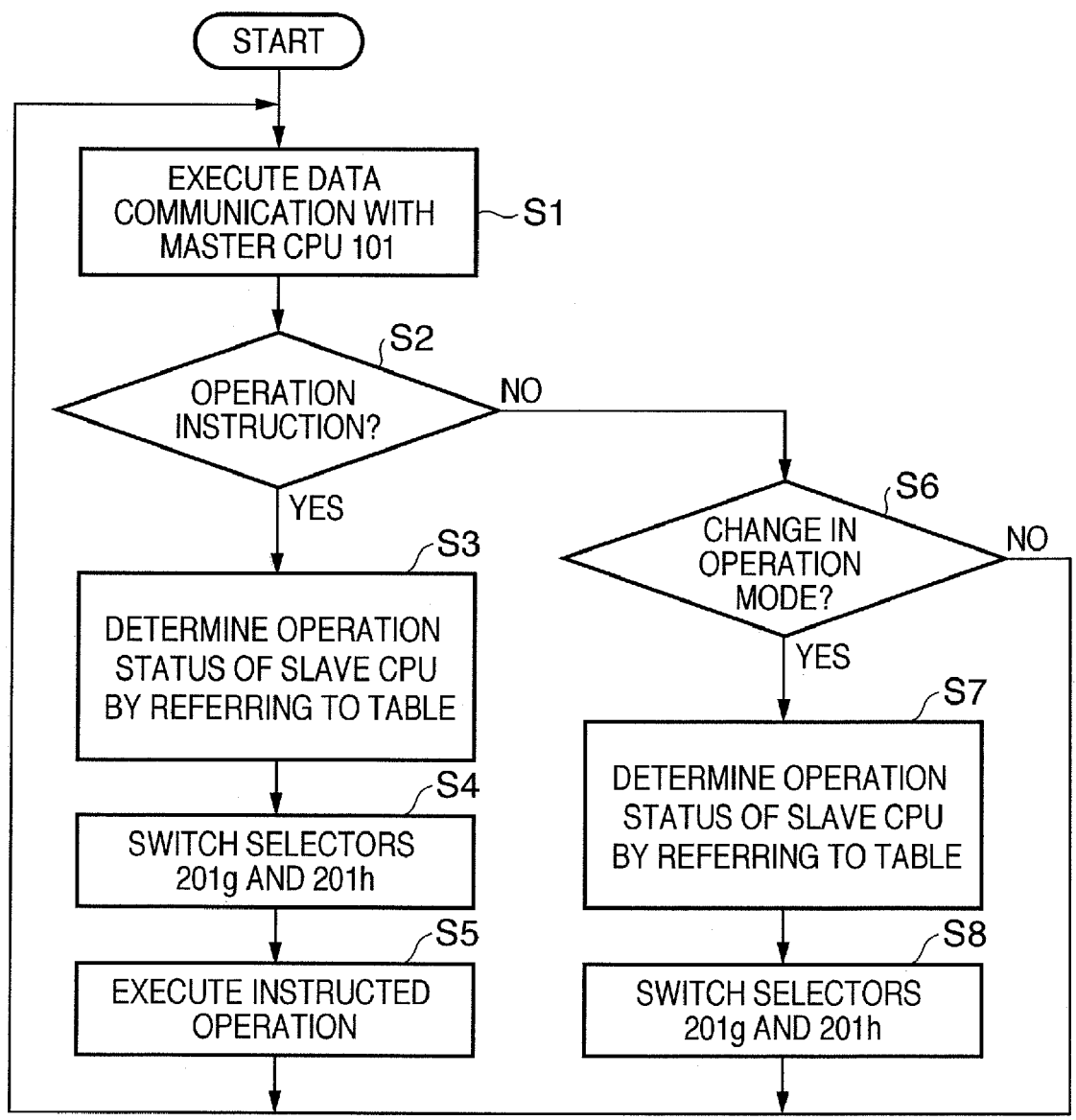
FIG. 7 is a flowchart for explaining the process by the slave CPU of each sub circuit board according to the second embodiment.

FIG. 7 is a flowchart for explaining the process by the slave CPU of a sub circuit board. The process by the slave CPU 201a of a first sub circuit board 200 will be exemplified here. However, the slave CPUs of other sub circuit boards execute basically the same process, and a description thereof will be omitted. A ROM which connects to a slave CPU stores a program for executing this process.

This process starts upon turning on of the printer apparatus. In step S1, the slave CPU 201a checks whether data from a master CPU 101 exists. If the data exists, the slave CPU 201a executes a data communication process for receiving and analyzing it. If the received data exists, the process advances to step S2 to cause the slave CPU 201a to determine whether the received data is instruction data of the operation mode of the image forming apparatus. The instruction in this case includes instruction operations to start a paper feed operation, start image formation, and discharge paper in accordance with the function controlled by each sub circuit board. Examples of operation modes corresponding to the power consumption amount commonly sent to each sub circuit board are a normal operation, standby mode, low-power mode, and sleep mode in descending order of power consumption amount.

If the received data is instruction data of the operation mode (YES in step S2), the process advances to step S3 to cause the slave CPU 201a to determine its own operation status referring to a table (see FIG. 4) stored in a RON 201d. In step S4, the slave CPU 201a outputs select signals 220 and 221 in accordance with the determined operation status to determine, in turn, a clock and voltage to be supplied to the slave CPU 201a. In step S5, the slave CPU 201a executes a process corresponding to the determined operation mode. This process is different for each sub circuit board, and a detailed description thereof will be omitted here. After completing the instructed process, the slave CPU 201a notifies the master CPU 101 of the processing result. The process then returns to step S1.

If the received data is not instruction data of the operation mode (NO in step S2), the process advances to step S6 to cause the slave CPU 201a to determine whether it has been notified of a change in operation mode. At this time, the slave CPU 201a determines, for example, that a change from the sleep mode to the standby mode has occurred. If the slave CPU 201a determines that the operation mode has been changed (YES in step S6), the process advances to step S7 to cause the slave CPU 201a to determine the operation status of the operation statuses A to D, corresponding to the changed operation mode by referring to the table (see FIG. 4) stored in the RON 201d as in step S3. In step S8, the slave CPU 201a outputs select signals 220 and 221 in accordance with the determined operation status to determine, in turn, a clock and/or voltage to be supplied to the slave CPU 201a. The process then returns to step S1.

The master CPU 101 issues a processing command (operation mode command) to each corresponding sub circuit board in accordance with each operation mode of the printer apparatus. The master CPU 101 sends information associated with the operation of the entire apparatus such as sleep and standby to all the sub circuit boards.

As has been described above, according to the second embodiment, each sub circuit board controls the corresponding load as the control target, and an ASIC of a main circuit board processes image data and controls communication between each sub circuit board and a master CPU. A plurality of energy saving modes are provided for each sub circuit board to be able even to change the current energy saving mode in accordance with the status mode of the apparatus. This allows better energy saving control of the entire apparatus.

For example, in the printer apparatus according to the second embodiment, the number of control targets (=N) and even the number of operation modes (=M) increase. For example, it is possible to further classify the print operation modes into before the start of paper feed and after the end of paper feed. This allows energy saving control even during printing by stopping the operation of the slave CPU of each sub circuit board which controls paper feed.

The slave CPU of each sub circuit board controls energy saving of itself. Even when the value of N×M greatly increases, it is possible to process the above-described jobs without increasing the load on the master CPU.

In the second embodiment, to process the above-described jobs, the load on the master CPU does not completely become zero because the master CPU and each slave CPU must exchange a message indicating that "the current status mode of the image forming apparatus is a low-power mode". However, in an actual printer apparatus, for example, the number of loads to be controlled (=N) is about 50, and the number of operation modes (=N) is about 20. In view of this, the present invention produces a large effect of reducing the load on the master CPU according to the second embodiment.

Although power consumption has exemplified control by setting the operating condition in the second embodiment, the present invention is not limited to this. For example, the present invention is applicable to a process such as collection of the operation logs of respective control targets, calculation of cumulative consumption of expendables such as toner, or collection of age-based change information of each control target.

According to the present invention, it is possible to set the operating condition for every sub circuit board corresponding to each control target. This makes it possible to, for example, control power saving for every sub circuit board corresponding to each control target.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-121272 filed on Apr. 25, 2006, which is hereby incorporated by reference herein in its entirety.

What is claimed is:

1. An image forming apparatus comprising:
    a master CPU configured to control an operation of the image forming apparatus;
    a slave CPU configured to control a control target;
    a communication unit configured to execute communication between said master CPU and said slave CPU; and
    a storage unit configured to store an operating condition corresponding to a power consumption amount of said slave CPU in accordance with an operation mode of the image forming apparatus,
    wherein said slave CPU, upon receiving the operation mode sent by said master CPU via said communication unit;
    reads from said storage unit an operating condition corresponding to the received operation mode; and
    changes an operation of said slave CPU on the basis of the operating condition.

2. The apparatus according to claim 1, wherein the operating condition is a condition to reduce power consumption, and includes change in voltage value to be supplied to said slave CPU and change in clock frequency to be supplied to said slave CPU.

3. The apparatus according to claim 1, wherein said slave CPU, said communication unit, and said storage unit are provided on a circuit board different from a circuit board on which said master CPU is provided.

4. The apparatus according to claim 1, wherein said slave CPU is provided for each of a plurality of control targets, and the operating condition stored in said storage unit is determined for each of the control targets.

5. The apparatus according to claim 1, further comprising:
a power supply unit adapted to generate power supply voltages having a plurality of different voltage values; and
a selection unit adapted to select, in accordance with a selection signal output from said slave CPU, the voltage value of the power supply voltage generated by said power supply unit, and supply the power supply voltage corresponding to the selected voltage value to said slave CPU.

6. The apparatus according to claim 1, further comprising:
a clock signal generator adapted to generate a plurality of clock signals having a plurality of different frequencies; and
a selection unit adapted to select, in accordance with a selection signal output from said slave CPU, a clock signal generated by said clock signal generator and supply the selected clock signal to said slave CPU.

7. The apparatus according to claim 1, further comprising:
a frequency division unit adapted to frequency-divide a communication clock to be used by said communication unit; and
a selection unit adapted to receive the communication clock and the clock signal frequency-divided by said frequency division unit and supply, to said slave CPU, a clock signal selected in accordance with a selection signal output from said slave CPU.

8. The apparatus according to claim 1, wherein the operation mode of the image forming apparatus is the operation mode corresponding to a power consumption amount of the image forming apparatus.

9. The apparatus according to claim 8, wherein the operation mode of the image forming apparatus includes an operation mode when an image forming operation period is divided into before a paper feed operation and after the paper feed operation.

10. A method of controlling an image forming apparatus which comprises a master CPU configured to control an operation of the image forming apparatus, a slave CPU configured to control a control target, a communication unit configured to execute communication between the master CPU and the slave CPU, and a storage unit configured to store an operating condition corresponding to a power consumption amount of the slave CPU in accordance with an operation mode of the image forming apparatus, comprising the steps of:
notifying, from the master CPU, the slave CPU of an operation mode of the image forming apparatus;
causing the slave CPU to read an operating condition corresponding to the operation mode from the storage unit, in accordance with a notification in the notifying step; and
causing the slave CPU to set an operation of the slave CPU based on the operating condition.

11. The method according to claim 10, wherein the operating condition is a condition to reduce power consumption, and includes change in voltage value to be supplied to the slave CPU and change in clock frequency to be supplied to the slave CPU.

12. The method according to claim 10, wherein the master CPU notifies the slave CPU of the operation mode of the image forming apparatus via the communication unit.

13. The method according to claim 10, wherein the slave CPU is provided for each of a plurality of control targets, and the operating condition stored in the storage unit is determined for each of the control targets.

14. The method according to claim 10, further comprising the steps of:
frequency-dividing a communication clock to be used by the communication unit; and
supplying, to the slave CPU, a clock signal selected from the communication clock and the clock signal frequency-divided in the frequency-dividing step, in accordance with a selection signal output from the slave CPU.

15. The method according to claim 10, wherein the operation mode of the image forming apparatus is the operation mode corresponding to a power consumption amount of the image forming apparatus.

16. The method according to claim 15, wherein the operation mode of the image forming apparatus includes an operation mode when an image forming operation period is divided into before a paper feed operation and after the paper feed operation.

* * * * *